UNITED STATES PATENT OFFICE.

GEORGE N. JEPPSON AND CARL F. DIETZ, OF WORCESTER, MASSACHUSETTS, ASSIGNORS TO NORTON COMPANY, A CORPORATION OF MASSACHUSETTS.

ANTISLIPPING CERAMIC TILE.

1,292,953.     Specification of Letters Patent.     Patented Jan. 28, 1919.

No Drawing.     Application filed April 29, 1918. Serial No. 231,547.

*To all whom it may concern:*

Be it known that we, GEORGE N. JEPPSON and CARL F. DIETZ, citizens of the United States of America, residing at Worcester, in the county of Worcester and State of Massachusetts, have invented certain new and useful Improvements in Antislipping Ceramic Tiles, of which the following is a full, clear, and exact specification.

Our invention relates to anti-slipping surfaces and more particularly to ceramic tile containing anti-slipping granules of hard material embedded therein to give a high surface friction, these tiles being designed for use as a tread surface where a pedestrian's personal safety is liable to be endangered by an uncertain foothold.

It has been proposed to employ as a tread surface a ceramic tile containing hard granular material such as previously fused alumina. It is essential or at least desirable that such an anti-slipping block posssess certain characteristics. It should contain granular material of a hardness and durability capable of withstanding footwear for an indefinite time. There should be a sufficient number of exposed grains which are large enough to give the desired frictional qualities, but due regard must be paid to the fact that the larger the projecting particle the greater the abrasion of footgear contacting with it. A bond should be employed to bind the granules together, which is tough and of high tensile strength and which is highly adherent and in intimate contact with the non-slipping particles to keep them from being disrupted or torn from the surface. The capillarity or porosity of the body should be reduced to a low degree for sanitary reasons, whereby moisture in a material amount cannot permeate the structure.

It is accordingly an object of our invention to provide as a tread block a ceramic tile containing hard and durable anti-slipping material, which will resist footwear for a long period of time, which is very dense, tough and of high tensile strength, which is neither too slippery nor too rough and abrading on foot gear, which is highly impervious to moisture and unobjectionable from sanitary considerations and which requires no special construction for assembling it in place but may be embedded in concrete or laid down as a flooring block.

With this and other objects in view as will appear from the following disclosure, our invention resides in the combination of parts set forth in the accompanying description, and covered by the claims appended hereto.

As a specific embodiment of our invention we provide a ceramic anti-slipping tile containing a wear resisting granular material of a hardness of 9 or more on Moh's scale, such as previously fused alumina or silicon carbid. For this material, we prefer to utilize previously molten alumina owing to the extreme hardness as well as the durability of such alumina when subjected to prolonged footwear. Because of the disruptive abrasion to which the tile is exposed, it is found unsatisfactory to use a relatively soft bonding material, such as cement or concrete, to hold the alumina in place. The burnt ceramics, however, possess the requisite qualifications for such a tile, hence we preferably utilize therefor a vitrifying or glass forming clay bond, as for example a bond of feldspar, slip clay and ball clay, although various types of ceramic bonds may be employed.

Unless special provisions are made to the contrary, ceramic tiles of this type may be highly porous, and possess a large degree of capillarity for absorbing moisture or liquid bodies falling on their surfaces, and so become unsanitary or otherwise objectionable. Moreover, the tensile strength of the tile and the resistance of the bond to the disruptive action of footwear depends largely upon the intimacy of contact between the bond and the anti-slipping grains and upon the density of the body. If the tile is made of large grains of alumina, the structure tends to be porous and the bond may not have intimate contact with all the grain surfaces or possess the requisite degree of toughness. On the other hand, if the granules are too small, the tile does not have sufficient surface roughness to serve as an anti-slipping tread although the intimacy of union with the bond is improved.

We accordingly employ in our preferred type of tile such a combination of grain sizes as will give a dense, compact and intimately associated structure, which is highly impervious to water and has satisfactory non-slipping qualities without being unnecessarily destructive to shoe leather. While various sizes of grain may obviously be selected and yet be within the scope of our invention, we find that a grain which will just pass through a 36 inch mesh affords a good anti-slipping surface. In order to fill the interstices between these grains we mix therewith a grain of 120 mesh or finer. To obtain the maximum density, we utilize a combination of sizes, preferably so graded and proportioned that the second sized particles will fit in the average space between the largest grains when they are in contact and the third size will in turn fit in the remaining spaces and so on, whereby the material is densely packed in the space allotted to it. While this densest formation is often desirable, we however may employ other combinations of sizes provided a coarse and a fine grain is present.

The fine grain of alumina has the valuable function of partially dissolving in the fused ceramic bond during the burning operation, forming with silica derived from the bond needle-like crystals of sillimanite. Since the bond also has some solvent action on the outer layer of the larger alumina grains, the result is the formation of an almost homogeneous mass or a highly intimate union between the fused clay bond and the alumina.

Our tile may be made by suitable ceramic operations modified in accordance with the construction and composition desired. For example, a mixture of previously fused alumina grain of mesh sizes 20, 60 and 180 may be incorporated with a glass fusing clay bond of feldspar, ball clay and slip clay. After wetting, the mass may be compacted in a steel mold under high pressure to increase the density of the body and form it in the desired shape. Then the tile is dried and burned for about 100 hours in a ceramic kiln at a temperature around 1300° C., sufficient to fuse the bond and form a ceramic article. This operation and the subsequent cooling are carried on slowly to prevent injury to the tile.

If the tile thus made is considered too porous or absorbent for some special use to which it is to be applied, it may be rendered impervious to moisture by filling the pores or those adjacent the surfaces with a suitable moisture proof filler, such as molten shellac or rosin. If such a resinous filler as shellac is used it may be heated after the tile is impregnated to transform it into a material which serves as a supplemental bond, due to its being substantially infusible at ordinary temperatures.

This tile may be made in various forms as desired, but is preferably used as a thin flat plate having a continuous top surface of rectangular shape lying in one plane, whereby it may be laid on a suitable foundation like a paving stone and present an unbroken surface to traffic. It may be fastened to its support by any suitable means as, for example, by a screw or bolt passing through a small perforation or by grooves in its under surface being filled with the cement of the base, if such is employed.

We claim as our invention:—

1. An anti-slipping tile comprising wear resisting granular particles of a hardness of 9 or more, bonded together with a vitrifiable ceramic material as a unitary tile, the tile containing coarse grains adapted to prevent footgear slipping thereon interspersed with fine grains which render the body dense, compact and of high tensile strength.

2. An anti-slipping tile comprising a hard, compressed mass of crystalline aluminum oxid grain, bonded together by a glassy fused ceramic clay material, said tile containing coarse grains which give large anti-slipping characteristics, interspersed with fine grains within the pores between the coarser ones, rendering the tile dense and highly impermeable to water, said finer grains being intimately associated with the bond and forming therewith a unitary, compact body of high tensile strength.

3. An anti-slipping tile comprising previously fused alumina grain and a ceramic clay material bond intimately and unitarily associated as a dense hard mass capable of resisting prolonged footwear and of preventing slipping thereon, the surface pores of the tile being filled with a substance rendering the tile impervious to water.

4. An anti-slipping tile, comprising previously fused alumina granules bonded with a ceramic clay material, said alumina consisting of large granules, capable of making the tile surface anti-slipping, interspersed with smaller grains intimately associated with the bond to form a dense compact mass, and a moisture impervious filler in the surface pores of the tile.

Signed at Worcester, Massachusetts, this 27th day of April, 1918.

GEORGE N. JEPPSON.
CARL F. DIETZ.